J. H. COLTHAR.
Improvement in Fruit-Gatherers.

No. 132,634. Patented Oct. 29, 1872.

James H. Colthar
By Knight Bros
Att'ys.

Attest:
Jas. H. Layman
William M. Davis

UNITED STATES PATENT OFFICE.

JAMES H. COLTHAR, OF HAMERSVILLE, OHIO.

IMPROVEMENT IN FRUIT-GATHERERS.

Specification forming part of Letters Patent No. 132,634, dated October 29, 1872.

*To all whom it may concern:*

Be it known that I, JAMES H. COLTHAR, of Hamersville, Brown county, Ohio, have invented an Improved Fruit-Picker, of which the following is a specification:

Nature and Objects of the Invention.

This invention relates to a device wherewith fruit that grows too high to be reached by hand can be gathered in a convenient and expeditious manner, and without bruising or otherwise injuring it. My fruit-picker consists essentially of a circular, elliptical, or other suitably-shaped frame, from which depends an open-mouthed bag or receptacle, into which the fruit drops as soon as severed from the stem, this separation being effected by means of a knife attached to said frame, and the bag or receptacle is provided with an inclined diaphragm which prevents the bruising or mashing of the fruit by retarding its descent. The bag has also an opening at bottom, closed when in use by a draw-string or other fastening, and capable of being opened for the discharge of the bag.

The above-described frame, together with its accessories, is attached to a handle or pole, which enables the operator to reach the highest branches.

Description of the Accompanying Drawing.

Figure 1:
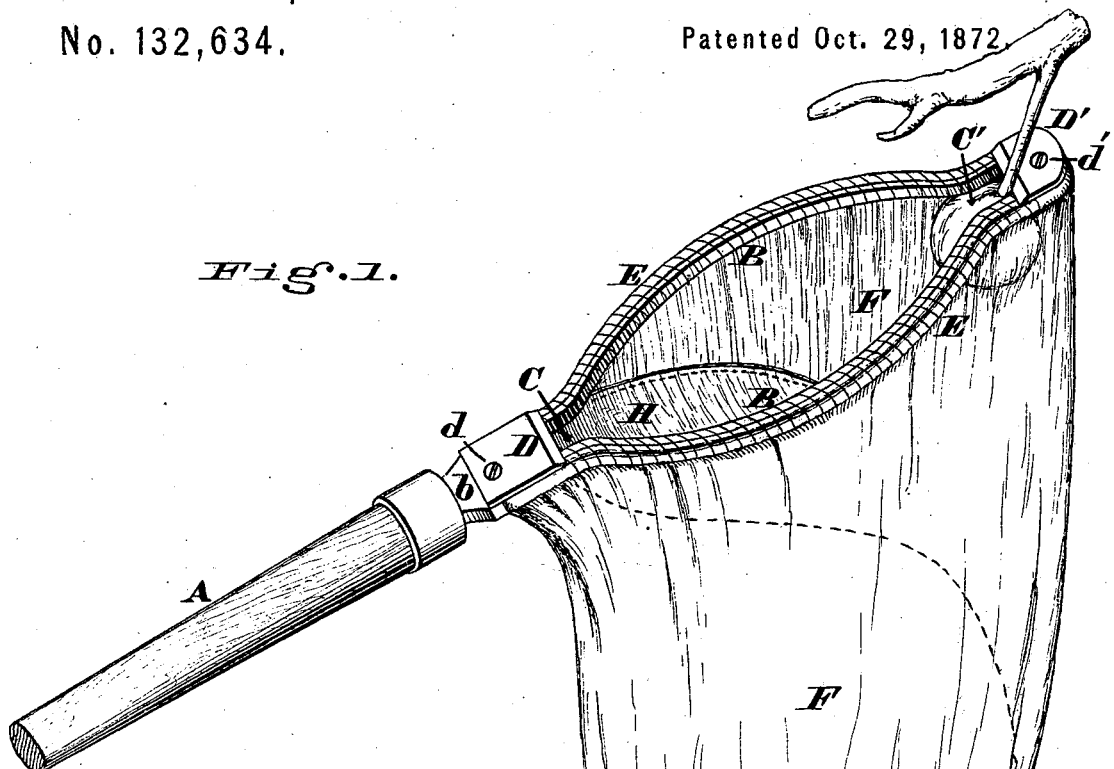
Figure 2:
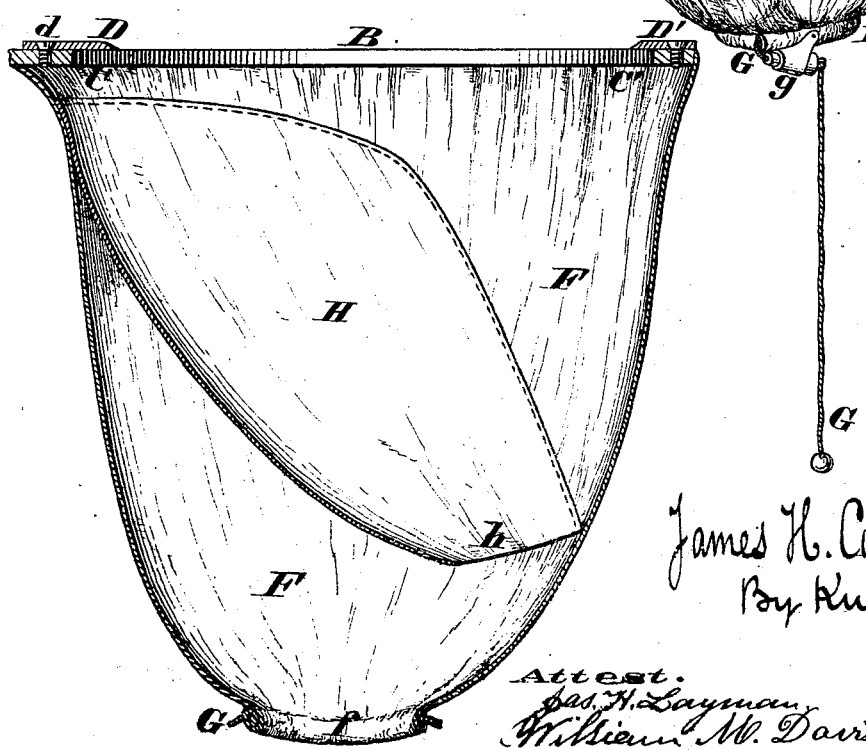

Figure 1 is a perspective view of my improved fruit-picker, the implement being shown in position for use. Fig. 2 is a vertical section through the bag or receptacle, the handle and a portion of the frame being broken away.

A represents a suitable pole or handle, into or upon which is driven the shank $b$ of a light metallic frame or ring, B, which may have a circular, elliptical, or other preferred shape. This frame is provided with two contractions or throats, C C', athwart which are placed the cutters D D', the latter being attached to said frame by the screws $d\ d'$. Secured to the frame B, by stitching E or otherwise, is an open-mouthed bag or receptacle, F, whose lower end is also open, and is furnished with a tuck, $f$, for the reception of a draw-string, G, wherewith the said lower end may be opened or closed, as occasion may require. This draw-string may have a latchet, $g$, like those in use on umbrellas, for retaining the lower opening to its closed condition, or said opening may for this purpose be provided with hooks and eyes or buttons or other devices. Secured obliquely downward athwart the bag, and attached thereto at its upper end, is a diaphragm, H.

Operation.

To use this implement, the lower end of the bag F is closed by drawing upon the string G and uniting the coupling $g$, as seen in Fig. 1. The implement is then elevated so as to allow the fruit to enter the upper end of the bag, after which the handle A is pulled downward toward the operator, causing the stem of the fruit to enter the throat C', and to be severed by the knife D'. The severed fruit, instead of falling directly to the bottom of the receptacle F, drops upon the inclined diaphragm H, and gradually rolls down said diaphragm to its mouth $h$, whence it passes into the lower part of the bag. It will thus be seen that the diaphragm H prevents any forcible striking of the descending fruit upon those in the bag. After the receptacle F has become sufficiently charged the implement is lowered, the retaining devices $g$ released, and the bag emptied of its contents.

Whenever the fruit grows in such a way that it cannot be conveniently cut with the knife D' the knife D may be brought into service, in which case the handle of the implement will be thrust instead of being pulled upon.

I claim as new and of my invention—

The combination, substantially as described, of the frame B $b$ C C', open-mouthed receptacle F $f$, inclined diaphragm H $h$, and retaining device G $g$ or its equivalent, either with or without one or more cutters, D, or their equivalent, for the purpose set forth.

In testimony of which invention I hereunto set my hand.

JAMES H. COLTHAR.

Attest:
GEO. H. KNIGHT,
JAMES H. LAYMAN.